United States Patent
Lee et al.

(10) Patent No.: US 8,624,860 B2
(45) Date of Patent: Jan. 7, 2014

(54) ELECTRONIC DEVICE INCLUDING TOUCH SCREEN DISPLAY, INTERFACE METHOD USING THE SAME, AND COMPUTER-READABLE STORAGE MEDIUM STORING THE SAME

(75) Inventors: Hyungnam Lee, Anyang-si (KR); Mijun Yoo, Seoul (KR); Hyoni Kim, Seongnam-si (KR); Uniyoung Kim, Seoul (KR); Yooseok Cho, Seoul (KR); Yuonui Chong, Seoul (KR)

(73) Assignee: LG Electronics Inc., Seoul (KR)

( * ) Notice: Subject to any disclaimer, the term of this patent is extended or adjusted under 35 U.S.C. 154(b) by 236 days.

(21) Appl. No.: 13/184,280

(22) Filed: Jul. 15, 2011

(65) Prior Publication Data

US 2012/0013557 A1    Jan. 19, 2012

(30) Foreign Application Priority Data

Jul. 16, 2010 (KR) .......................... 10-2010-0069123

(51) Int. Cl.
   *G06F 3/041* (2006.01)
(52) U.S. Cl.
   USPC .......................................... 345/173
(58) Field of Classification Search
   USPC ..................... 345/173, 73, 156, 419, 660
   See application file for complete search history.

(56) References Cited

U.S. PATENT DOCUMENTS

| | | | |
|---|---|---|---|
| 5,856,822 A * | 1/1999 | Du et al. | 345/73 |
| 7,995,030 B2 * | 8/2011 | Joung et al. | 345/156 |
| 2007/0257891 A1 | 11/2007 | Esenther et al. | |
| 2009/0150775 A1 * | 6/2009 | Miyazaki et al. | 715/702 |
| 2009/0164945 A1 | 6/2009 | Li | |
| 2009/0309899 A1 | 12/2009 | Tytgat | |
| 2010/0013780 A1 * | 1/2010 | Ikeda et al. | 345/173 |
| 2011/0164060 A1 * | 7/2011 | Miyazawa et al. | 345/660 |
| 2011/0175830 A1 * | 7/2011 | Miyazawa et al. | 345/173 |
| 2012/0007854 A1 * | 1/2012 | Cho | 345/419 |

FOREIGN PATENT DOCUMENTS

| | | |
|---|---|---|
| CN | 101127621 A | 2/2008 |
| CN | 101464771 A | 6/2009 |
| CN | 101605244 A | 12/2009 |

* cited by examiner

*Primary Examiner* — Fred Tzeng
(74) *Attorney, Agent, or Firm* — Birch, Stewart, Kolasch & Birch, LLP

(57) ABSTRACT

According to an embodiment of the present invention, an interface for controlling a display of a plurality of layers on a touch screen display includes displaying, on a touch screen display of the device, a main display layer and at least one sub display layer, detecting an object-down event at a first position within the main display layer, detecting an object-dragging event at a second position within the main display layer, and moving the main display layer along a movement direction from the first position to the second position, wherein at least one of the at least one sub display layer is displayed to be pulled to the movement direction in accordance with the movement of the main display layer.

22 Claims, 21 Drawing Sheets

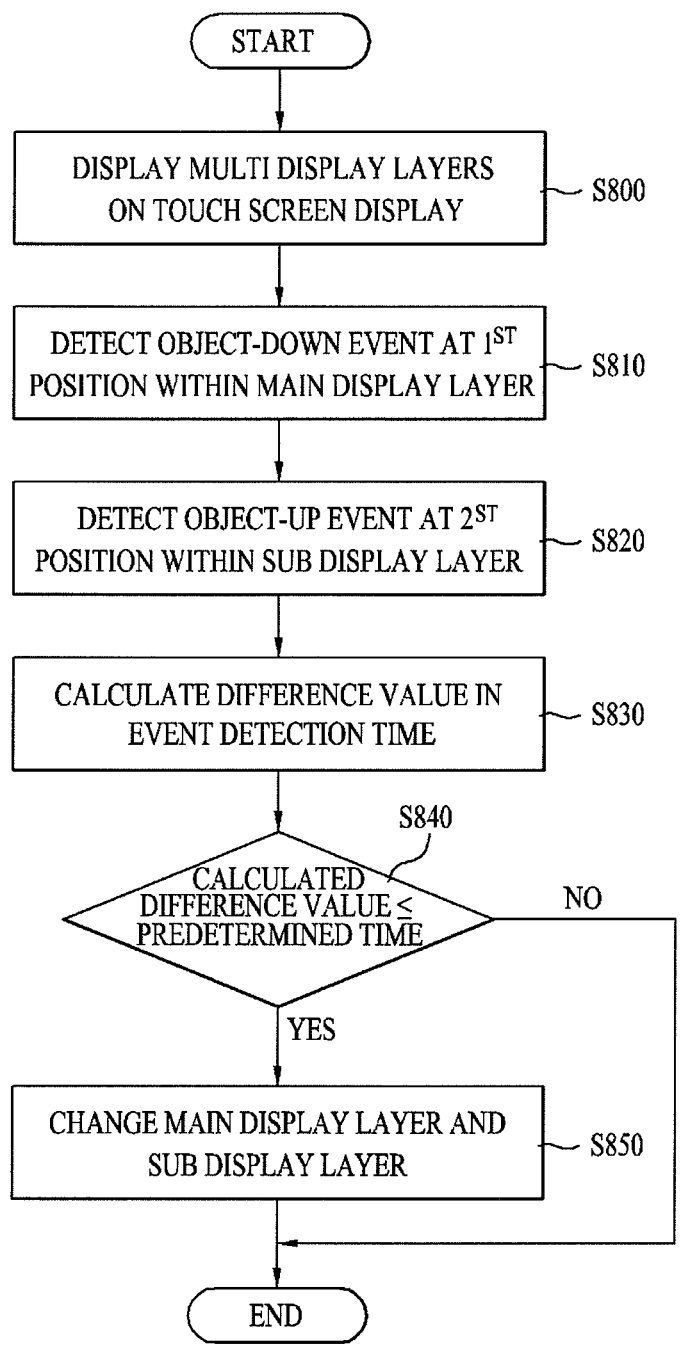

ELECTRONIC DEVICE INCLUDING TOUCH SCREEN DISPLAY, INTERFACE METHOD USING THE SAME, AND COMPUTER-READABLE STORAGE MEDIUM STORING THE SAME

This application claims the benefit of the Korean Patent Application No. 10-2010-0069123, filed on Jul. 16, 2010, which is hereby incorporated by reference as if fully set forth herein.

BACKGROUND OF THE INVENTION

1. Field of the Invention

The present invention relates to an electronic device including a touch screen display and an interface method using the same and, more particularly, to an electronic device including a touch screen display and an interface method using the same that perform operations associated with a detected touch, when a touch is detected.

2. Discussion of the Related Art

Recently, the display technology depicting and displaying 3-dimensional (3D) images is being extensively researched and developed and applied in a variety of fields. Most particularly, electronic devices applying the technology of displaying 3D images so as to display 3D images, have recently been drawing a great deal of attention.

The technology of displaying 3D images refers to a display technology using a parallax (or difference) in stereoscopic perspectives enabling a viewer to volumetrically view (or see) the displayed image due to the parallax (or difference) in both perspectives. Herein, the 3D display technology may be categorized into a shutter glass display method, a non-glasses display method, a real 3D display method, and so on. More specifically, the shutter glass display method is disadvantageous in that the viewer is required to be equipped with a separate device, such as putting on a separate pair of polarized 3D glasses. And, the non-glasses display method is disadvantageous in that the viewer can view the displayed 3D images only at a specified location. Accordingly, since diverse disadvantages exist in the shutter glass display method and the non-glasses display method, extensive development of the real 3D display method is currently in progress.

Additionally, the recent electronic devices are being developed to have a slimmer structure in order to enable the users (or viewers) to re-position (or re-locate) their display devices with more convenience, and the recent electronic devices are being developed so as to be equipped with an input device, such as a touch pad or a touch screen, for a more convenient manipulation of the electronic device. In the recently developed electronic devices, when the touch pad or the touch screen is touched, the respective operations may be performed. Herein, such operations may correspond to selecting particular items from the display screen. Furthermore, such operations may include paging (i.e., turning pages), scrolling, panning, zooming, and so on.

In the touch pad, the motion of an input pointer corresponds to a respective movement of the user's finger, when the user's finger moves (or slides) along the surface of the touch screen. Conversely, a touch screen corresponds to a type of display screen having a touch-sensitive transparent panel covering the display screen. When using the touch screen, (generally by using a stylus pen or his (or her) finger) the user directly points to a graphic user interface (GUI) object from the display screen, thereby selecting the corresponding GUI object.

SUMMARY OF THE INVENTION

Accordingly, the present invention is directed to an electronic device including a touch screen display and an interface method using the same that substantially obviate one or more problems due to limitations and disadvantages of the related art.

Another object of the present invention is to provide an electronic device including a touch screen display and an interface method using the same that cause an optical illusion of viewing a 3-dimensional image from a 2-dimensional display.

Another object of the present invention is to provide an electronic device including a touch screen display and an interface method using the same that can enable the user to conveniently select a variety of display screens.

Another object of the present invention is to provide an electronic device including a touch screen display and an interface method using the same that can enable the user to conveniently select a specific menu while viewing a displayed image.

A further object of the present invention to provide a computer-readable storage medium that stores a program for executing the interface method using the electronic device including a touch screen display.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in an aspect of the present invention, in a method being performed by an electronic device including a touch screen display, an interface method includes the steps of includes displaying a main display layer and at least one sub display layer on the touch screen display, wherein the main display layer is positioned at a center of a display screen, and wherein the at least one sub display layer is positioned at a side of the main display layer, detecting an object-down event at a first position within the main display layer, detecting an object-dragging event at a second position within the main display layer, and moving the main display layer along a movement direction from the first position to the second position, and pulling at least one of the at least one sub display layer in accordance with the movement of the main display layer.

Preferably, the pulled sub display layer may correspond to a sub display layer positioned in a direction opposite to the movement direction of the main display layer.

Herein, the interface method may further include detecting an object-up event at a third position within the main display layer, and stopping the movement of the main display layer in response to detecting the object-up event.

Preferably, the at least one sub display layer may be displayed so that the main display layer can appear to be positioned at a deeper end of the display screen.

Preferably, the at least one sub display layer may be displayed so that a width of the at least one sub display layer can be decreased along a direction facing into the main display layer.

Preferably, the at least one sub display layer may be respectively positioned at an upper-side, a lower-side, a left-side, and a right-side of the main display layer.

Preferably, one of the at least one sub display layer may display a broadcast image of at least one channel.

Preferably, one of the at least one sub display layer may display information associated with contents being displayed on the main display layer.

Preferably, one of the at least one sub display layer may display a chat window.

To achieve these objects and other advantages and in accordance with the purpose of the invention, as embodied and broadly described herein, in another aspect of the present invention, in a method being performed by an electronic device including a touch screen display, an interface method includes the steps of displaying a main display layer and at least one sub display layer on the touch screen display, wherein the main display layer is positioned at a center of a display screen, and wherein the at least one sub display layer is positioned at a side of the main display layer, detecting an object-down event at a first position within the at least one sub display layer, detecting an object-up event at a second position within the main display layer, and changing the sub display layer positioned at the first position and the main display layer.

Preferably, the at least one sub display layer may be respectively positioned at an upper-side, a lower-side, a left-side, and a right-side of the main display layer.

Preferably, one of the at least one sub display layer may display a broadcast image of at least one channel.

Preferably, one of the at least one sub display layer may display information associated with contents being displayed on the main display layer.

Preferably, one of the at least one sub display layer may display a chat window.

To achieve these objects and other advantages and in accordance with the purpose of the invention, as embodied and broadly described herein, in yet another aspect of the present invention, an electronic device including a touch screen display includes a touch screen display configured to display a main display layer and at least one sub display layer on the touch screen display, wherein the main display layer is positioned at a center of a display screen, and wherein the at least one sub display layer is positioned at a side of the main display layer, and a controller is configured to detect an object-down event at a first position within the main display layer, to detect an object-dragging event at a second position within the main display layer, and to move the main display layer along a movement direction from the first position to the second position, and to pull at least one of the at least one sub display layer in accordance with the movement of the main display layer.

Preferably, the at least one sub display layer may be displayed so that the main display layer can appear to be positioned at a deeper end of the display screen.

Preferably, the at least one sub display layer may be displayed so that a width of the at least one sub display layer can be decreased along a direction facing into the main display layer.

Preferably, the at least one sub display layer may be respectively positioned at an upper-side, a lower-side, a left-side, and a right-side of the main display layer.

Preferably, one of the at least one sub display layer may display a broadcast image of at least one channel.

Preferably, one of the at least one sub display layer may display information associated with contents being displayed on the main display layer.

Preferably, one of the at least one sub display layer may display a chat window.

Preferably, the pulled sub display layer may correspond to a sub display layer positioned in a direction opposite to the movement direction of the main display layer.

Preferably, the controller detects an object-up event at a third position within the main display layer and stops the movement of the main display layer in response to detecting the object-up event.

To achieve these objects and other advantages and in accordance with the purpose of the invention, as embodied and broadly described herein, in yet another aspect of the present invention, an electronic device including a touch screen display includes a memory configured to store at least one program, and a processor configured to execute the at least one program. Herein, the touch screen display may display a main display layer and at least one sub display layer on the touch screen display, the main display layer being positioned at a center of a display screen, and the at least one sub display layer being positioned at a side of the main display layer. Herein, the at least one program may include instructions for detecting an object-down event at a first position within the main display layer, instructions for detecting an object-dragging event at a second position within the main display layer, instructions for moving the main display layer along a movement direction from the first position to the second position, and instructions for pulling at least one of the at least one sub display layer in accordance with the movement of the main display layer.

To achieve these objects and other advantages and in accordance with the purpose of the invention, as embodied and broadly described herein, in a further aspect of the present invention, a computer-readable storage medium having stored therein instructions, which when executed by an electronic device including a touch screen display, cause the electronic device: display a main display layer and at least one sub display layer on the touch screen display, wherein the main display layer is positioned at a center of a display screen, and wherein the at least one sub display layer is positioned at a side of the main display layer, detect an object-down event at a first position within the main display layer, detect an object-dragging event at a second position within the main display layer, and move the main display layer along a movement direction from the first position to the second position, and pull at least one of the at least one sub display layer in accordance with the movement of the main display layer.

Since the electronic device including a touch screen display and the interface method using the same according to the present invention displays multi display layers by arranging each of the multi display layers in a volumetric layout, the present invention may provide an optical illusion of viewing a 3-dimensional (3D) display through a 2-dimensional (2D) display. Additionally, by moving and pulling display layers in accordance with the movements of a detected touch, the user may be given the impression of manipulating the electronic device through a 3D display. Furthermore, since the positions of the multi display layers can be easily changed and moved, the user may be able to conveniently select and view the wanted (or desired) screen. Finally, since the user can immediately select a wanted menu displayed on another display layer, while viewing a previously selected image, the user may be capable of selecting a wanted menu more conveniently and more quickly.

According to an embodiment of the present invention, an interface for controlling a display of a plurality of layers on a touch screen display includes displaying, on a touch screen display of the device, a main display layer and at least one sub display layer, wherein the main display layer is positioned at a center area of the touch screen display, and wherein the at least one sub display layer is positioned at a side of the main display layer; detecting an object-down event at a first position within the main display layer; detecting an object-dragging event at a second position within the main display layer; and moving the main display layer along a movement direction from the first position to the second position, wherein at least one of the at least one sub display layer is displayed to be pulled to the movement direction in accordance with the movement of the main display layer.

According to an embodiment of the present invention, an interface method for controlling a display of layers in a device includes displaying, on a touch screen display of the device, a plurality of layers including a main display layer and at least one sub display layer, wherein the main display layer is positioned at a center area of the touch screen display, and wherein the at least one sub display layer is positioned at a side of the main display layer, detecting an object-down event at a first position of the touch screen display within a first layer of the plurality of layers, detecting an object-up event at a second position of the touch screen display within a second layer of the plurality of layers, and changing a display state depending on locations of the first and second positions, wherein the first layer is different from the second layer.

According to an embodiment of the present invention, an electronic device includes a touch screen display configured to display a main display layer and at least one sub display layer, wherein the main display layer is positioned at a center area of the touch screen display, and the at least one sub display layer is positioned at a side of the main display layer, and a controller configured to detect an object-down event at a first position within the main display layer, to detect an object-dragging event at a second position within the main display layer, and to move the main display layer along a movement direction from the first position to the second position, wherein at least one of the at least one sub display layer is displayed to be pulled towards the movement direction in accordance with the movement of the main display layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 8 illustrates process steps of an interface method shifting a main display layer to a sub-display layer according to an embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In addition, although the terms used in the present invention are selected from generally known and used terms, some of the terms mentioned in the description of the present invention have been selected by the applicant at his or her discretion, the detailed meanings of which are described in relevant parts of the description set forth herein. Furthermore, it is required that the present invention is understood, not simply by the actual terms used but by the meanings of each term lying within.

Figure 1:
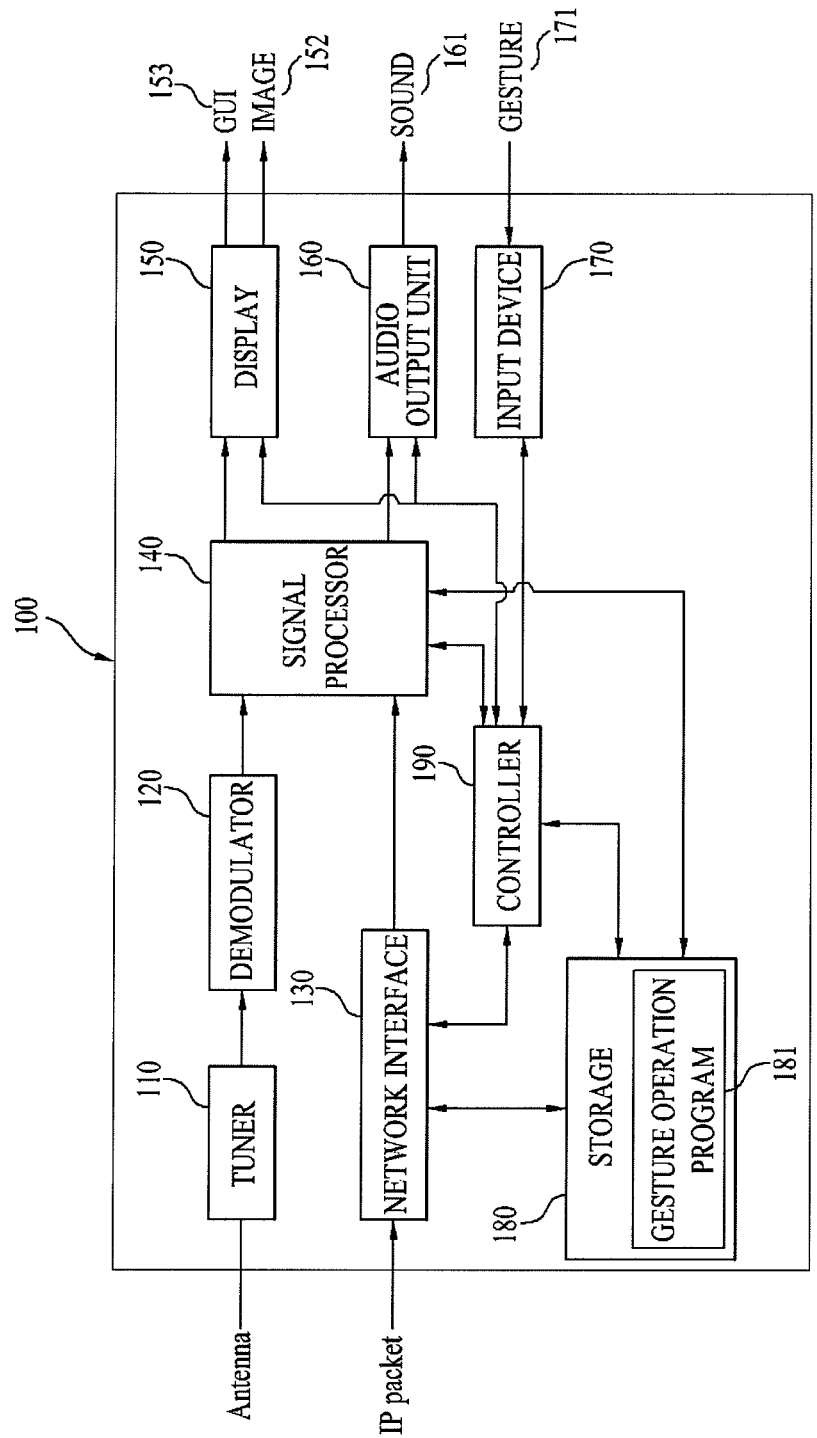
FIG. 1 illustrates a block view showing a structure of an electronic device according to an embodiment of the present invention.

FIG. 1 illustrates a block view showing a structure of an electronic device according to an embodiment of the present invention.

Referring to FIG. 1, the electronic device 100 according to the present invention includes a tuner 110, demodulator 120, a network interface 130, a signal processor 140, a display 150, an audio output unit 160, an input device 170, a storage 180, and a controller 190. Herein, the electronic device 100 may correspond to a personal computer system, such as a desktop computer, a laptop computer, a tablet computer, a handheld computer, and so on. Additionally, the electronic device 100 may also corresponds to a portable device, such as a mobile phone, a smart phone, a digital broadcasting equipment (or terminal), a personal digital assistant (PDA), a portable multimedia player (PMP), a navigation system, and so on, or may correspond to a fixed electronic household appliance, such as a digital television (DTV) receiver.

Among a plurality of radio frequency (RF) broadcast signals being received through an antenna, the tuner 110 selects an RF broadcast signal respective to a channel selected by the user (or viewer). Then, the tuner 110 converts the selected RF broadcast signal to an intermediate frequency (IF) signal or a baseband video or audio signal. For example, if the selected RS broadcast signal corresponds to a digital broadcast signal, the tuner 110 converts the selected signal to a digital IF (DIF) signal. And, if the selected RF broadcast signal corresponds to an analog signal, the tuner 110 converts the selected signal to an analog baseband video or audio signal (CVBS SIF). More specifically, the tuner 110 may process digital broadcast signals or analog broadcast signals. The analog baseband video or audio signal (CVBS SIF) outputted from the tuner 110 may be directly inputted to the signal processor 140.

Furthermore, the tuner 110 may also receive single-carrier RF broadcast signals according to an advanced television system committee (ATSC) method or multi-carrier RF broadcast signals according to a digital video broadcasting (DVB) method.

According to another embodiment of the present invention, the electronic device 100 may be provided (or equipped) with at least 2 tuners. When the electronic device 100 is provided with at least 2 tuners, just as a first tuner, a second tuner selects an RF broadcast signal respective to a channel selected by the user (or viewer), among a plurality of radio frequency (RF) broadcast signals being received through an antenna, the tuner 110. Then, the second tuner converts the selected RF broadcast signal to an intermediate frequency (IF) signal or a baseband video or audio signal.

Additionally, among the received RF broadcast signals, the second tuner may sequentially select TS broadcast signals of all broadcast channels stored through a channel memory function, thereby converting the sequentially selected RF broadcast signals to intermediate frequency (IF) singles or baseband video or audio signals. The second tuner may periodically perform the conversion procedures of all broadcast channels. Accordingly, the electronic device 100 may display the image of the broadcast signal converted by the first tuner and may simultaneously provide images of broadcast signals respective to several broadcast channels converted by the second tuner in the form of thumbnail views. In this case, the first tuner converts the main RF broadcast signal selected by the user to an IF signal or a baseband video or audio signal. And, the second tuner may sequentially and/or periodically select all of the RF broadcast signals, with the exception for the main RF broadcast signal, thereby converting the sequentially and/or periodically selected signal to an IF signal or a baseband video or audio signal.

The demodulator 120 receives the digital IF (DIF) signal converted by the tuner 110 so as to perform the demodulation procedure. For example, in case the digital IF signal outputted from the tuner 110 corresponds to an ATSC type signal, the demodulator 120 performs an 8-vestigial side band (8-VSB) demodulation procedure. In another example, if the signal outputted from the tuner 110 corresponds to a DVB type signal, the demodulator 120 performs a coded orthogonal frequency division modulation (COFDMA) procedure.

Moreover, the demodulator 120 may also perform channel-decoding. In order to do so, the demodulator 120 may be provided with a trellis decoder, a deinterleaver, a Reed-Solomon (RS) decoder, and so on, so as to perform trellis decoding, deinterleaving, and Reed-Solomon (RS) decoding.

After performing the demodulation and channel-decoding processes, the demodulator 120 may output a stream signal (TS). At this point, the stream signal may correspond to a multiplexed signal having a video signal, an audio signal, or a data signal multiplexed therein. For example, the stream signal may correspond to an MPEG-2 transport stream (TS) consisting of an MPEG-2 standard video signal multiplexed with a Dolby AC-3 standard audio signal multiplexed. More specifically, the MPEG-2 TS may include a 4-byte header and a 184-byte payload.

The stream signal outputted from the demodulator 120 may be inputted to the signal processor 140. The signal processor 140 performs demultiplexing and signal processing procedures on the inputted stream signal. Thereafter, the signal processor 140 outputs the video data (or video signal or image) to the display 150 and outputs the audio data (or audio signal or sound) to the audio output unit 160.

Furthermore, in case of a digital broadcast receiver provided with at least two tuners, the digital broadcast receiver may be provided with a number of demodulators corresponding to the number of tuners provided therein. Also, the demodulators may each be separately provided depending upon the ATSC type and the DVB type.

The network interface 130 receives data packets that are received from a network and also transmits data packets to the network. More specifically, the network interface 130 receives IP packets that deliver broadcast data from a service provider through the network. Herein, broadcast data refer to contents, update messages notifying whether or not contents have been updated, metadata, service information data, software codes, and so on. Also, service information may include service information on real-time broadcast services and service information on internet services. Herein, internet services refer to services that can be provided via the internet, such as CoD (Content's on Demand) services, YouTube services, information services including weather forecasts, news, regional information, search services, and so on, entertainment services including games, karaoke services, and so on, and communication services including TV mailing services, TV SMS (Short Message Services), and so on. Accordingly, in the present invention, digital broadcast receivers include network TVs, web TVs, and broadband TVs. Also, broadcast services may include broadcast services being provided via groundwave (or terrestrial), satellite, and cable and may also include internet services.

The controller 190 executes commands and performs operations associated with the electronic device 100. For example, by using a command searched from the storage 180, the controller 190 may control the input and output of data between the components of the electronic device 100 and may also control data reception and data processing. Herein, the controller 190 may be realized in the form of a single chip, multiple chips, or a plurality of electric assembly parts. For example, various types of architecture such as an exclusive or embedded processor, a single-purpose processor, a controller, an ASIC, and so on, may be used for the controller 190.

Along with an operating system, the controller 190 executes a computer code and performs operations of generating (or creating) and using data. An operating system is generally disclosed, and, therefore, a detailed description of the operating system will be omitted for simplicity. For example, the operating system may correspond to any one of a Windows OS, Unix, Linux, Palm OS, DOS, Android, and Macintosh, and so on. The operating system, another computer code, and data may exist within the storage 180, which operates in connection to the controller 190.

The storage 180 generally provides a space for storing program codes and data that are used by the electronic device 100. For example, the storage 180 may be realized in the form of a Read-Only Memory (ROM), a Random Access Memory (RAM), a hard disk drive, and so on. Program codes and data may exist in a detachable storage medium. And, when required, the program codes and data may be loaded or installed to the electronic device 100. Herein, the detachable storage medium may include a CD-ROM, a PC-CARD, a memory card, a floppy disk, an electro-magnetic tape, a network component, and so on.

The display 150 may operate in connected with the controller 190. The display 150 may correspond to a liquid crystal display (LCD) (e.g., an active matrix LCD, a passive matrix LCD, and so on). In another example, the display 150 may also correspond to a monitor, such as a monochrome display, a color graphics adapter (CGA) display, an enhanced graphics adapter (EGA) display, a variable graphics-array (VGA) display, a super VGA display, a cathode ray tube (CRT), and so on. The display 150 may also correspond to a plasma display or to a display that is realized by an electronic link.

The display 150 may display a graphic user interface (GUI) 153, which provides an interface that can be easily and conveniently used between the user of the electronic device and the operating system, or between the user of the electronic device and an application that is currently being executed within the operating system. Herein, the GUI 153 expresses programs, files, and operation options in the form of graphic images. More specifically, a graphic image may include a window, a field, a dialog box, a menu, an icon, a button, a cursor, and a scroll bar. Such graphic images may be aligned in accordance with a pre-defined layout or may be dynamically generated (or created) in order to assist on (or help) specific measures taken by the user of the electronic device. During the operation, in order to execute functions and operations associated with various graphic images, the user may select and activate a specific graphic image. For example, the user may select a button for opening, closing, minimizing, or maximizing a window, or the user may select an icon executing (or driving) a particular program.

The input device 170 may correspond to a touch screen positioned on the display 150 or in front of the display 150. Herein, the touch screen may be formed as a single body with the display 150, or the touch screen may be provided as a separate component. In case the touch screen is provided as a single body with the display 150, the touch screen may also be referred to as the display. As the touch screen is installed in front of the display 150, the user may directly manipulate (or maneuver) the GUI 153. For example, the user may simply put his (or her) finger on the object that is to be controlled. In case of a touch pad, such one-to-one (1:1) correspondence cannot be provided.

In case of using a touch pad, the touch pad is spaced apart from the display 150 and positioned in a different plane. For example, the display 150 is generally is positioned on a vertical plane, and a touch pad is generally positioned on a horizontal plane. This structure leads to a less intuitive usage of the display 150 and the touch pad. Accordingly, in comparison with the usage of a touch screen, the usage of a touch pad is more difficult and inconvenient. In addition to being configured of a touch screen, the input device 170 may also correspond to a multipoint input device.

The controller 190 may recognize (or detect) a gesture 171 being applied to the input device 170, thereby being capable of controlling the electronic device 100 based upon the detected gesture 171. Herein, a gesture may be defined as a conventionalized interaction between the user and the input device 170, wherein the gesture is mapped to at least one or more particular computing operations. More specifically, the gesture 171 may be diversely performed by the hand of the user and, more particularly, by the movements of the fingers. As an alternative to the finger movements, or in addition to the finger movements, a gesture may be performed by using a stylus pen. Hereinafter, an item that produces (or causes) the gesture 171 may be referred to as an object.

The input device 170 receives the gesture 171, and the controller 190 executes the commands for performing the operations associated with the gesture 171. Furthermore, the storage 180 may include a gesture operation program 181 that may be a part of the operating system or a part of a separate application. The gesture operation program 181 generally includes a series of commands notifying at least one or more software agents of how to recognize the occurrence (or generation) of a gesture 171, of what measure(s) to take with respect to the recognized gesture 171 and/or in response to the recognized gesture 171.

When the user makes one or more gestures, the input device 170 delivers the respective gesture information to the controller 190. Then, by using a command language (or command) and, more particularly, by using the gesture operation program 181 from the storage 180, the controller 190 interprets the gesture 171, thereby controlling different components of the electronic device 100, such as the storage 180, the display 150, the audio output unit 160, the signal processor 140, the network interface 130, and the input device 170. The gesture 171 may be identified as commands performing the operations from the application stored in the storage 180, correcting the GUI object shown (or displayed) on the display 150, correcting the data stored in the storage 180, performing operations of the signal processor 140, and so on. For example, such commands may be associated with zooming, panning, scrolling, turning pages, rotations, size adjustments, image channel changes, contents reception, internet connection, and so on. Additionally, for example, the commands may also be associated with driving (or executing) a specific program, opening a file or document, seeing a menu, selecting a menu or option, executing a command, logging-on (or signing-in) to an internet site system, authorizing access of a certified individual to a limited area within the computer system, loading a user profile associated with the alignment of icons within the wallpaper according to the user's preference, and so on.

A wide variety of different gestures may be used. For example, a gesture may include a single point gesture or a multipoint gesture, a static or dynamic gesture, a continuous or segmented gesture, and so on. More specifically, a single point gesture corresponds to a gesture performed by a single contact point. For example, the single point gesture is performed by a single touch made by a finger or a palm of the user or by a stylus pen. A multipoint gesture corresponds to a gesture that can be made of multiple points (or contact points). For example, the multipoint gesture may be made of multiple touches, such as touches made by several fingers, one or more fingers and the palm, one or more fingers and the stylus pen, multiple stylus pens, or by a combination of at least two of the above. A static gesture corresponds to a gesture that does not include any movement. Furthermore, a continuous gesture corresponds to a gesture made of a single stroke, and a segmented gesture corresponds to a gesture consisting of a sequence of separate steps or strokes.

Generally, the contact between the object and the touch screen a plurality of different patterns. For example, within the touch screen, the single point gesture includes an object-down event followed by an object-up event, which is performed at the same point or approximate point of the object-down event. Within the touch screen, the dynamic gesture includes an object-down event followed by at least one object-dragging event, which is then followed by an object-up event.

According to some embodiments of the present invention, a parameter for describing processes of a finger approaching the touch screen display, the finger contacting the touch screen display, and the finger moving away from the touch screen display, is used. This parameter may correspond to at least one function among a distance between the finger and the touch screen display, a pressure of the finger touching the touch screen display, a contacting area between the finger and the touch screen display, a voltage between the finger and the touch screen display, a capacitance between the finger and the touch screen display, and other physical parameters.

According to some embodiments of the present invention, depending upon the size of a parameter (e.g., capacitance) between the finger and the touch screen display, when this specific parameter exceeds a pre-decided threshold value, the object-down event occurs. And, while this specific parameter exceeds the pre-decided threshold value, when the position of a cursor corresponding to the position of the finger moves from point A to point B, the object-dragging event occurs. Thereafter, when the parameter falls below the pre-decided threshold value, the object-up event occurs.

Figure 2A:
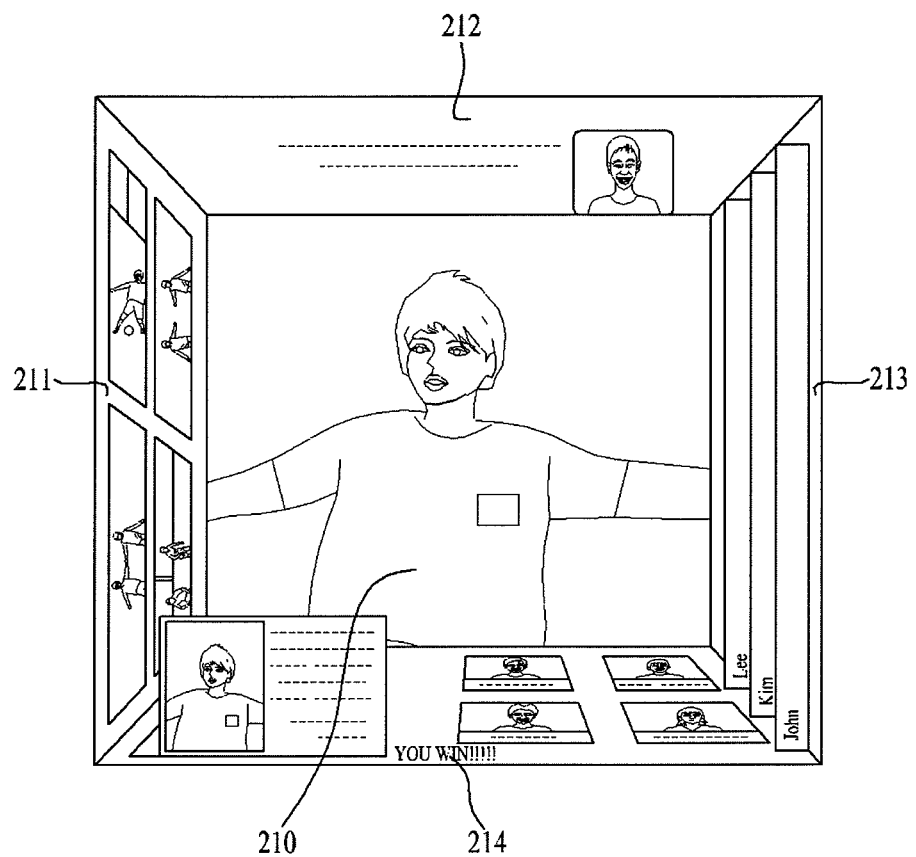
FIG. 2a to FIG. 2c respectively illustrate exemplary screens each having multiple display layers displayed thereto.
Figure 2B:
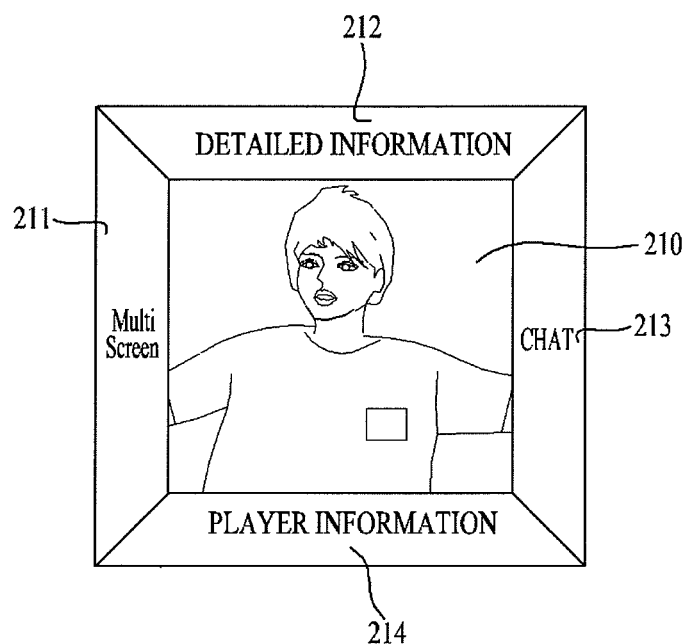
Figure 2C:
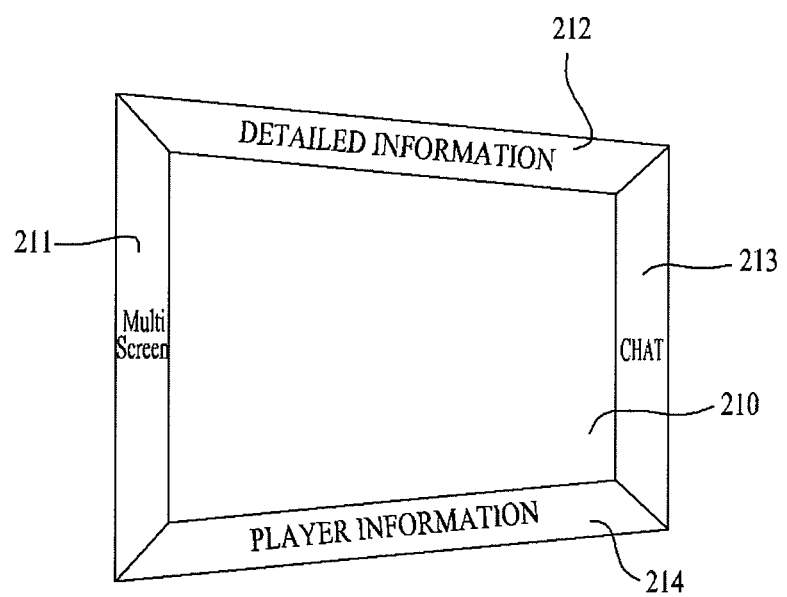

FIG. 2a to FIG. 2c respectively illustrate exemplary screens each having multiple display layers displayed thereto.

Referring to FIG. 2a to FIG. 2c, at least one display layers 210, 211, 212, 213, and 214 are displayed on the display screen. One display layer may correspond to one screen. Herein, an image received from one channel may be displayed, and at least one window may be displayed on one display layer. More specifically, the user selects one display layer from the plurality of display layers displayed on the screen, so that only the one selected display layer can be displayed on the screen.

The display layer 210 positioned at the center of the display screen is referred to as a main display layer, and the display layers 211, 212, 213, and 214 positioned beside the main layer are referred to as sub display layers. Herein, the sub display layers 211, 212, 213, and 214 are displayed so that the main display layer can appear to be positioned at a deeper end of the screen. More specifically, the sub display layers 211, 212, 213, and 214 are positioned at all sides of the main display layer so that the screen can be shown as a volumetric space. Accordingly, the main display layer can appear to be positioned at the deeper end of the display screen facing into the user.

According to the embodiment of the present invention, the sub display layers 211, 212, 213, and 214 may be displayed to face into the main display layer 210, wherein the width of each sub display layer becomes narrower so as to display a volumetric effect. Accordingly, the user may be under the illusion of looking inside a box. Thus, the electronic device 100 may provide the user with an optical illusion of viewing a three-dimensional (3D) image.

The sub display layer 211 located at the left-side of the main display layer 210 displays broadcast programs of multi channels. The user may select a specific broadcast program among the many broadcast programs being displayed from the sub display layer 211, so that the selected broadcast program can be displayed on the main display layer 210.

The sub display layer 212 located at the upper-side of the main display layer 210 displays detailed information on the broadcast program that is being displayed.

The sub display layer 213 located at the right-side of the main display layer 210 displays a chat window. This sub display layer 213 may display multiple chat windows, and the user may chat with another individual (or user) after selecting a specific chat window. Additionally, the user may perform operations enabling the selected chat window to be displayed in the main display layer 210.

The sub display layer 214 located at the bottom-side of the main display layer 210 displays information associated with contents being displayed in the main display layer 210. According to the embodiment shown in FIG. 2b, this sub display layer 214 displays player information on the player who is being displayed on the main display layer 210.

Figure 3A:
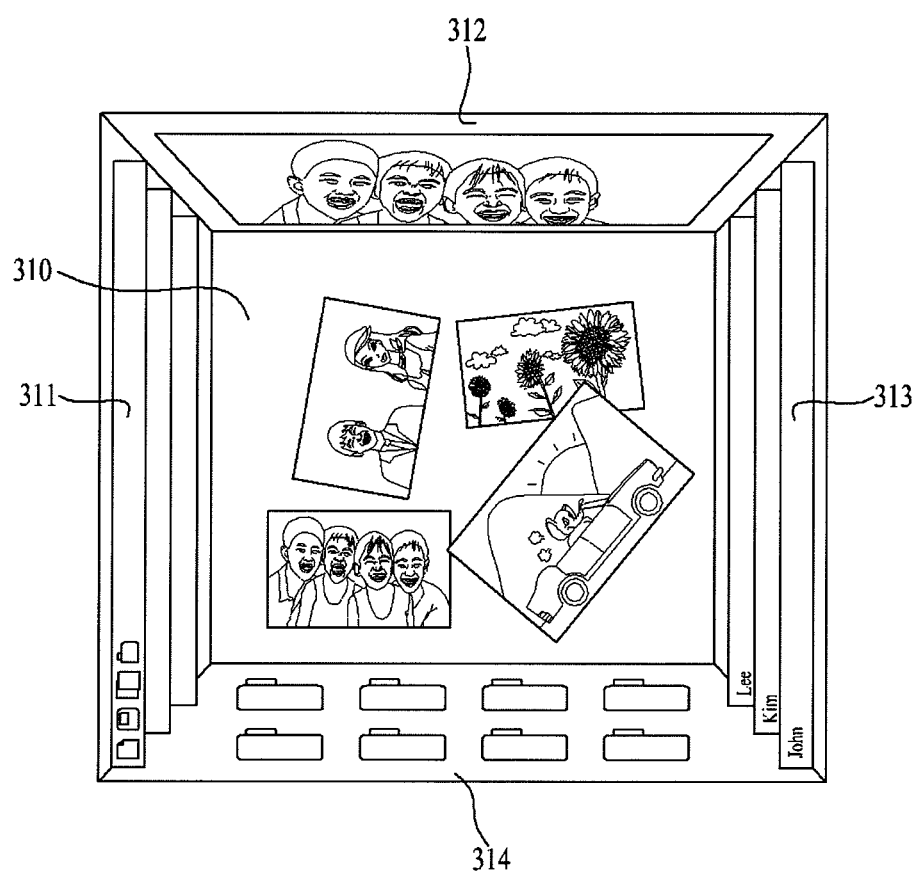
FIG. 3a to FIG. 3c respectively illustrate other exemplary screens each having multiple display layers displayed thereto.
Figure 3B:
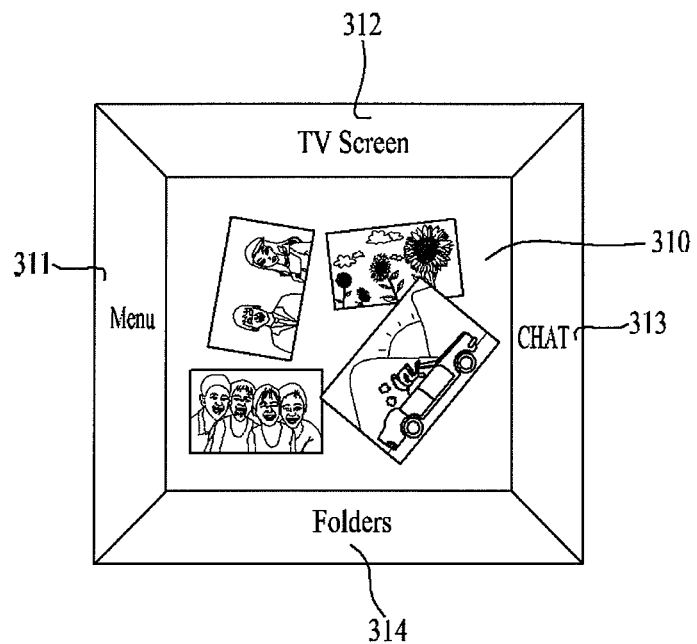
Figure 3C:
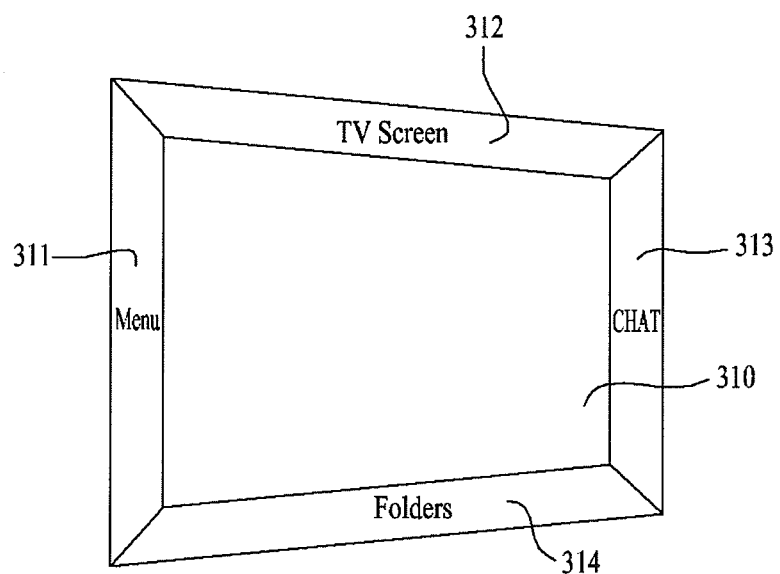

FIG. 3a to FIG. 3c respectively illustrate other exemplary screens each having multiple display layers displayed thereto.

Referring to FIG. 3a to FIG. 3c, the main display layer 310 displays photo files. The user may select a specific file among the photo files being displayed on the main display layer 210. Then, the user may enlarge the selected file and view the enlarged file.

A sub display layer 311 displays a menu. While viewing the main display layer, the user may manipulate the menu of this sub display layer 311, so as to allow a wanted (or desired) operation to be performed in the electronic device 100.

Another sub display layer 312 displays a broadcast program, and yet another sub display layer 313 displays a chat window. Furthermore, yet another sub display layer 314 displays a plurality of folders.

Figure 4:
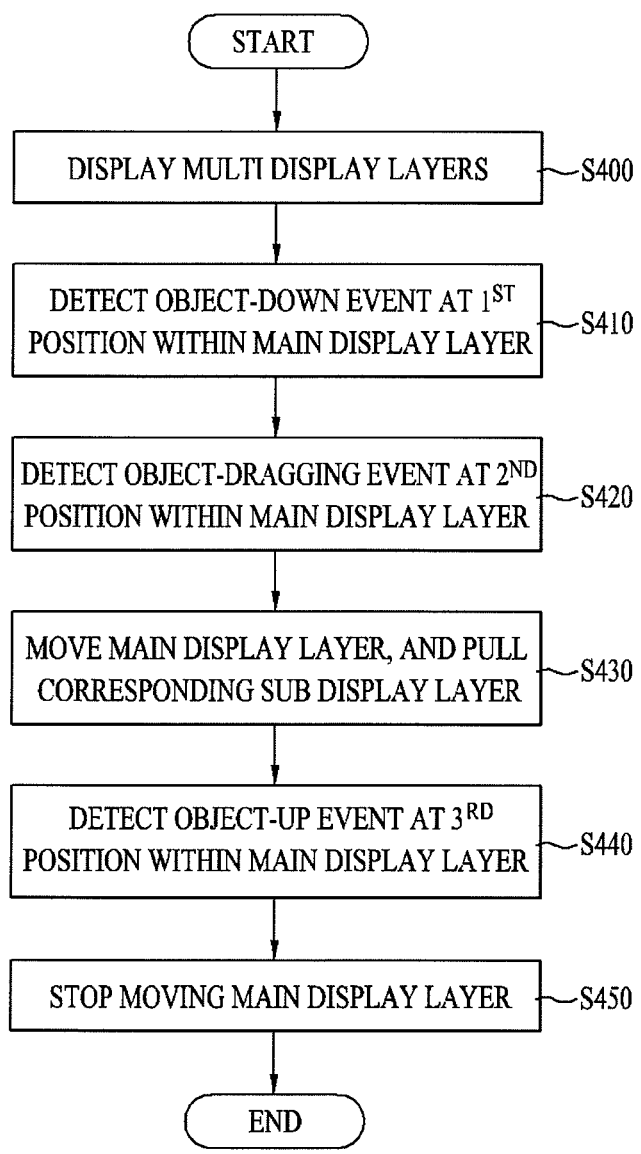
FIG. 4 illustrates process steps of an interface method moving (or re-positioning) a main display layer according to an embodiment of the present invention.

FIG. 4 illustrates process steps of an interface method moving (or re-positioning) a main display layer according to an embodiment of the present invention.

Referring to FIG. 4, the display 150 displays multi display layers (S400). Herein, the multi display layers may be displayed in an alignment of a main display layer and a plurality of sub display layers, as shown in FIG. 2a to FIG. 3c.

The controller 190 detects an object-down event at a first position within the main display layer (S410).

The controller 190 detects an object-dragging event at a second position within the main display layer (S420).

The controller 190 controls the electronic device 100 so that the main display layer can be moved, thereby controlling the electronic device 100 so that the corresponding sub display layer can be pulled (S430). Herein, the main display layer is displayed so as to be moved in accordance with the movement of the object. More specifically, the controller 190 moves the main display layer so that a pixel being displayed at a first position of the main display layer can be moved to a second position. Then, the corresponding sub display layer is displayed so as to be pulled in accordance with the movement of the main display layer. Furthermore, the corresponding sub display layer may correspond to the sub display layer located in a direction opposite to that of the movement of the main display layer.

Thereafter, the controller 190 detects an object-up event at a third position within the main display layer (S440). Herein, the object-up event may be detected from the same position as that of the object-dragging event.

Finally, the controller 190 stops the movement of the main display layer in response to detecting the object-up event (S450). More specifically, the controller 190 moves the main display layer so that the pixel being displayed at a second position of the main display layer can be moved to a third position. Then, the movement of the main display layer is stopped. Furthermore, the sub display layer that is pulled in accordance with the movement of the main display layer is displayed in its pulled state.

Figure 5A:
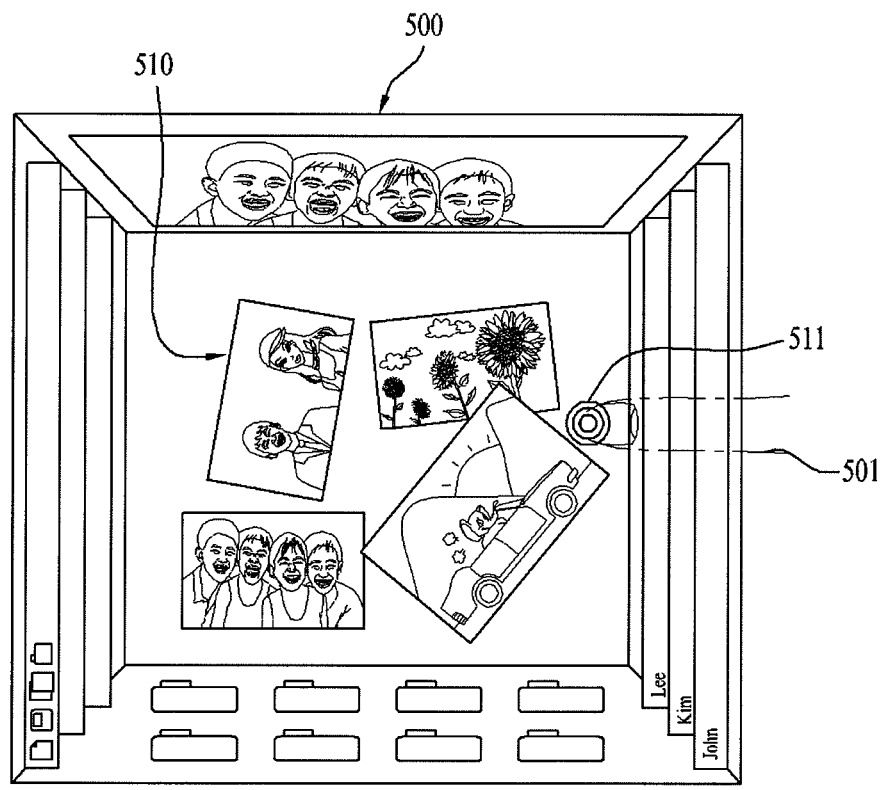
FIG. 5a to FIG. 5c respectively illustrate exemplary screens showing the process steps of the interface method moving (or re-positioning) the main display layer according to the embodiment of the present invention.
Figure 5B:
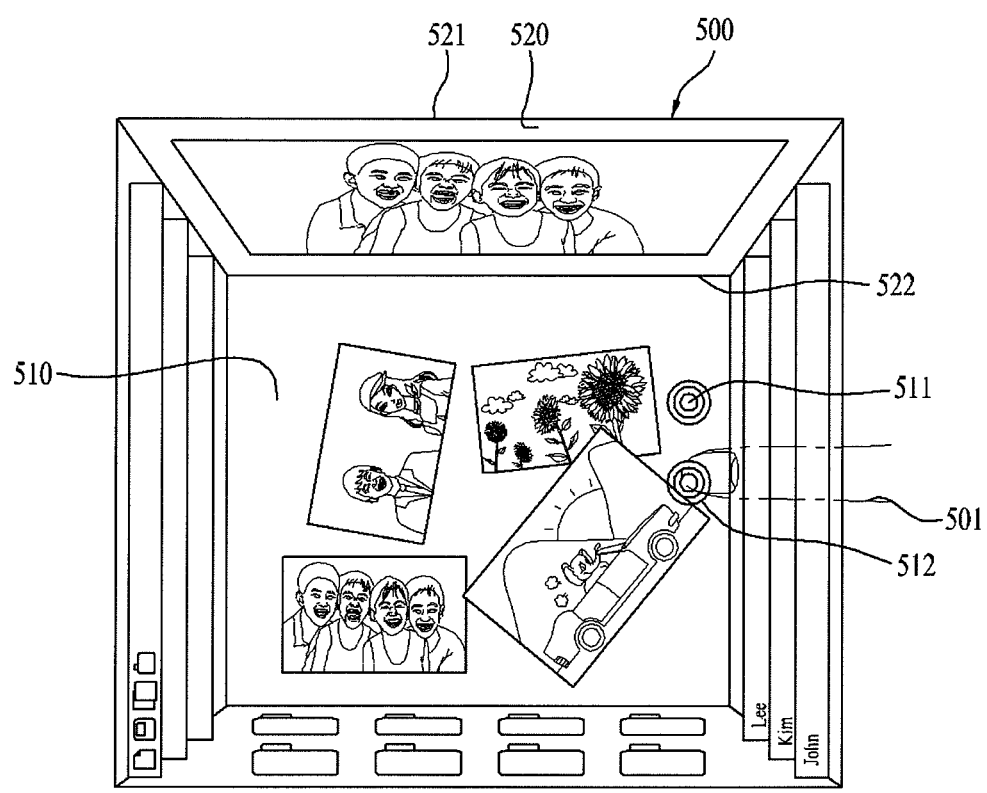
Figure 5C:
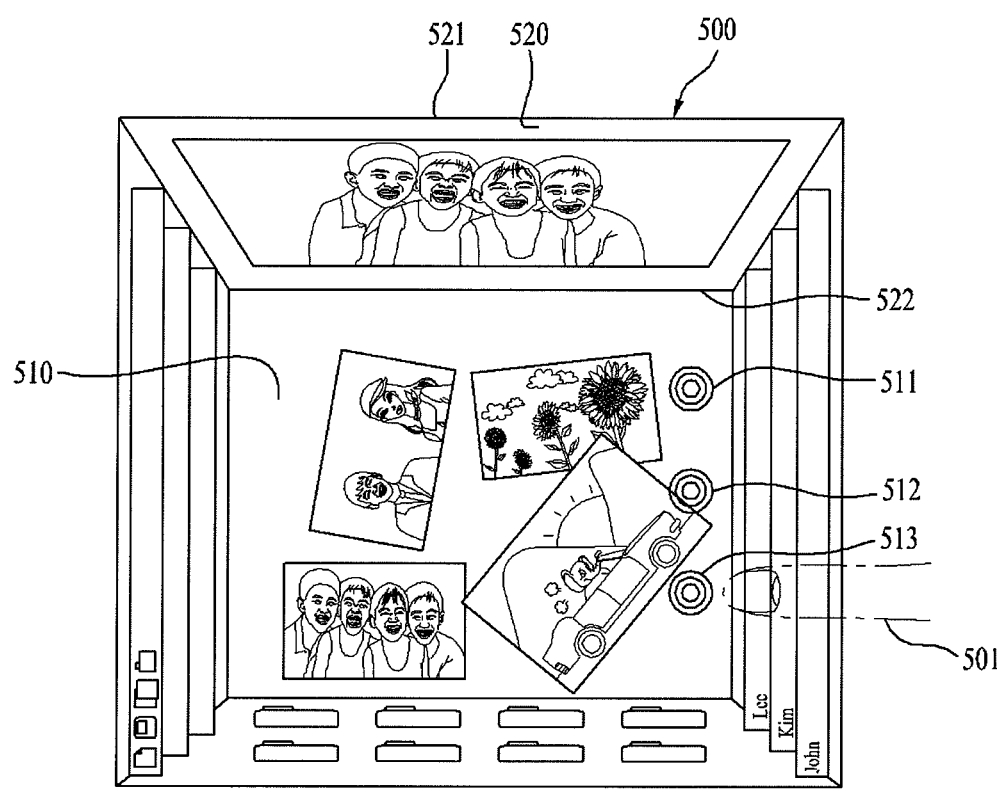

FIG. 5a to FIG. 5c respectively illustrate exemplary screens showing the process steps of the interface method moving (or re-positioning) the main display layer according to the embodiment of the present invention.

Referring to FIG. 5a to FIG. 5c, the controller 190 detects an object-down event at a first position 511 within the main display layer 510. Then, the object 501 moves from the first position 511 to a second position 512. At this point, the object 501 may move while being in contact with the touch screen display 500, and the object 501 may move while the parameter between the object and the touch screen display exceeds a predetermined threshold value. Thereafter, when the controller 190 detects an object-dragging event at the second position 512, the controller 190 moves the main display layer 510 along a direction of the movement from the first position 511 to the second position 512. Thus, the sub display layer 520 is pulled in accordance with the movement of the main display layer 510. More specifically, as one side 521 of the sub display layer 520 is fixed, and as another side 522 of the sub display layer 520 moves in accordance with the movement of the main display layer 510, the sub display layer 520 is displayed so as to appear to be pulled.

When the object 501 moves to a third position 513, and when the object 501 moves away from the touch screen display 500 or when the parameter becomes smaller than the predetermined threshold value, the controller 190 detects an object-up event at the third position 513. When the object-up event is detected, the controller 190 moves the main display layer 510 in a direction of movement from the second position 512 to the third position 513. Thereafter, the sub display layer 520 is pulled in accordance with the movement of the main display layer 510.

Figure 6:
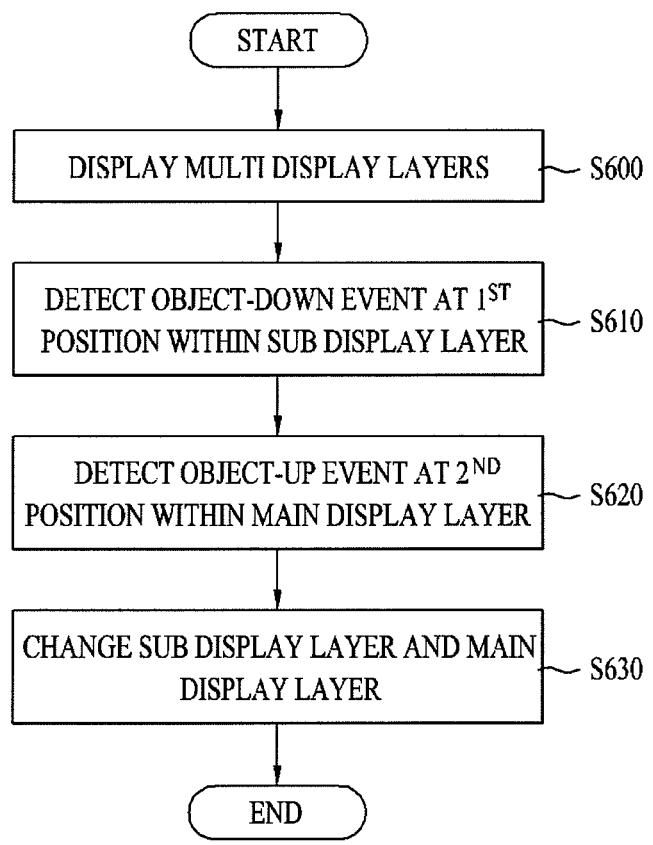
FIG. 6 illustrates process steps of an interface method shifting a sub-display layer to a main display layer according to an embodiment of the present invention.

FIG. 6 illustrates process steps of an interface method shifting a sub-display layer to a main display layer according to an embodiment of the present invention.

Referring to FIG. 6, the display 150 displays multi display layers (S600). Herein, the multi display layers may be displayed in an alignment of a main display layer and a plurality of sub display layers, as shown in FIG. 2a to FIG. 3c.

The controller 190 detects an object-down event at a first position within a sub display layer (S610).

The controller 190 detects an object-up event at a second position within the main display layer (S620).

The controller 190 changes the sub display layer located at a first position with the main display layer (S630). More specifically, the sub display layer located at the first position is moved to the position of the main display layer, thereby becoming the main display layer. Similarly, the main display layer is moved to the position of the sub display layer located at the first position, thereby becoming the sub display layer.

Figure 7A:
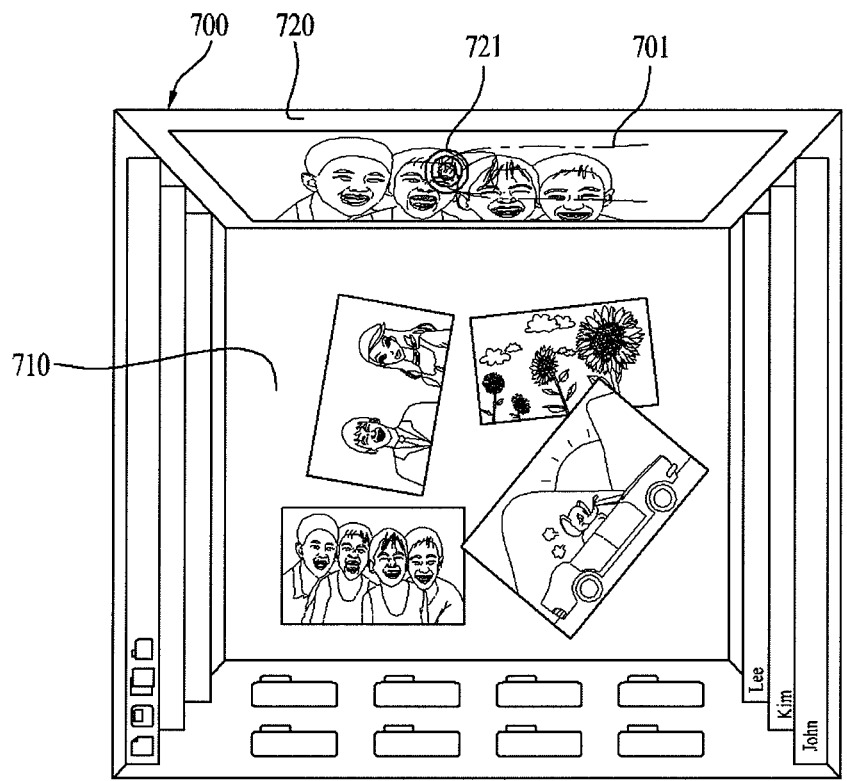
FIG. 7a to FIG. 7c respectively illustrate exemplary screens showing the process steps of the interface method shifting the sub-display layer to the main display layer according to the embodiment of the present invention.
Figure 7B:
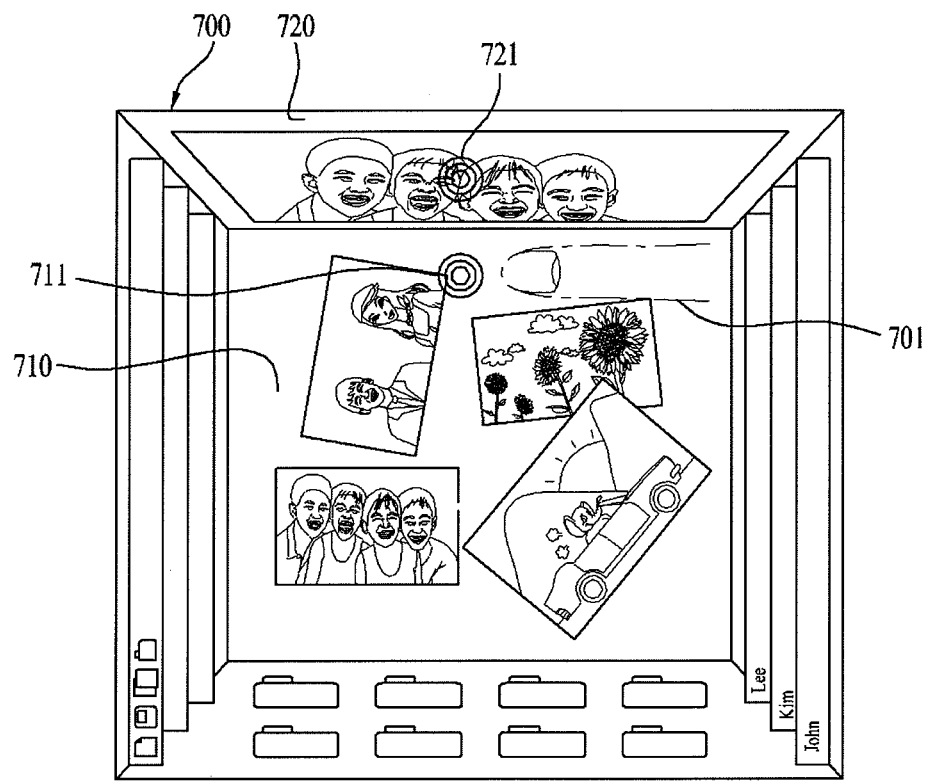
Figure 7C:
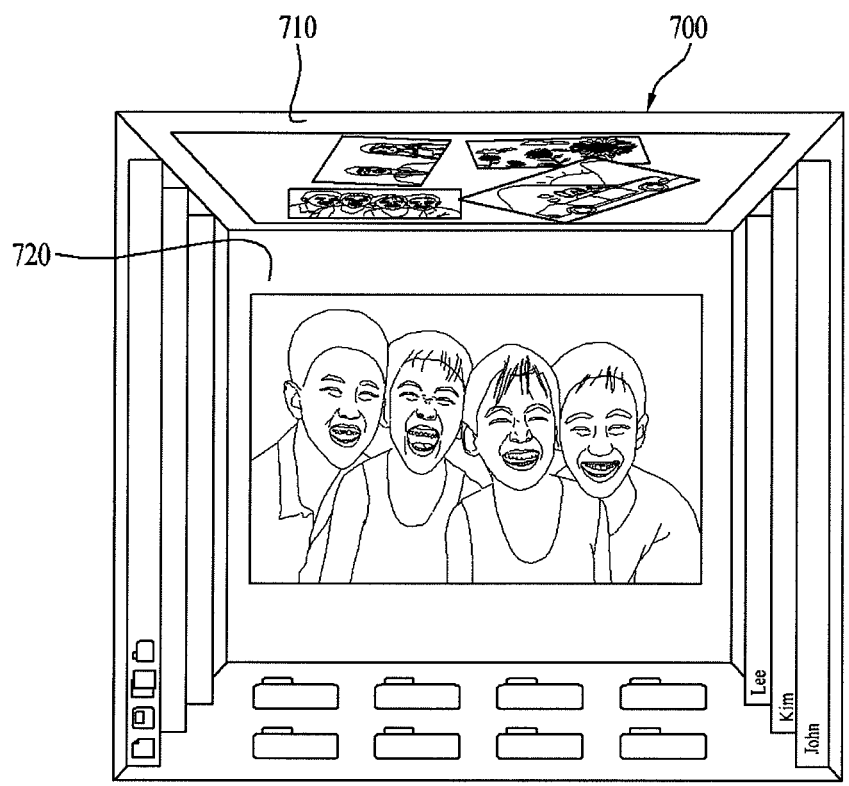

FIG. 7a to FIG. 7c respectively illustrate exemplary screens showing the process steps of the interface method shifting the sub-display layer to the main display layer according to an embodiment of the present invention.

Referring to FIG. 7a to FIG. 7c, the controller 190 detects an object-down event at a first position 721 within the sub display layer 720. Then, the object 701 moves from the first position 721 to a second position 711. At this point, the object 701 may move while being in contact with the touch screen display 700, and the object 701 may move while the parameter between the object and the touch screen display exceeds a predetermined threshold value. Thereafter, the controller 190 detects an object-up event at the second position 711 within the main display layer 710. When the object-down event is detected at the first position 721, and when the object-up event is detected at the second position 711, the controller 190 changes the positions of the sub display layer 720 and the main display layer 710. Accordingly, the sub display layer 720 becomes the main display layer.

FIG. 8 illustrates process steps of an interface method shifting a main display layer to a sub-display layer according to an embodiment of the present invention.

Referring to FIG. 8, the display 150 displays multi display layers (S800). Herein, the multi display layers may be displayed in an alignment of a main display layer and a plurality of sub display layers, as shown in FIG. 2a to FIG. 3c.

The controller 190 detects an object-down event at a first position within the main display layer (S810).

The controller 190 detects an object-up event at a second position within a sub display layer (S820).

The controller 190 calculates a difference value between the detection time of the object-down event and the detection time of the object-up event (S830).

The controller 190 verifies whether or not the calculated difference value is smaller than or equal to a time value predetermined in advance (S840). Herein, the time value predetermined in advance may correspond to a delay time during which the object-dragging event is detected while a dynamic gesture is being performed. Alternatively, the time value predetermined in advance may correspond to a specific time decided in accordance with the user's settings, or the time value predetermined in advance may correspond to a time decided by default during the design of the program.

When the calculated difference value is smaller than or equal to the time predetermined in advance, the controller 190 changes the main display layer and the sub display layer (S850). More specifically, the main display layer is moved to the position of the sub display layer located at the second position, thereby becoming the sub display layer. Similarly, the sub display layer located at the second position is moved to the position of the main display layer, thereby becoming the main display layer.

Figure 9A:
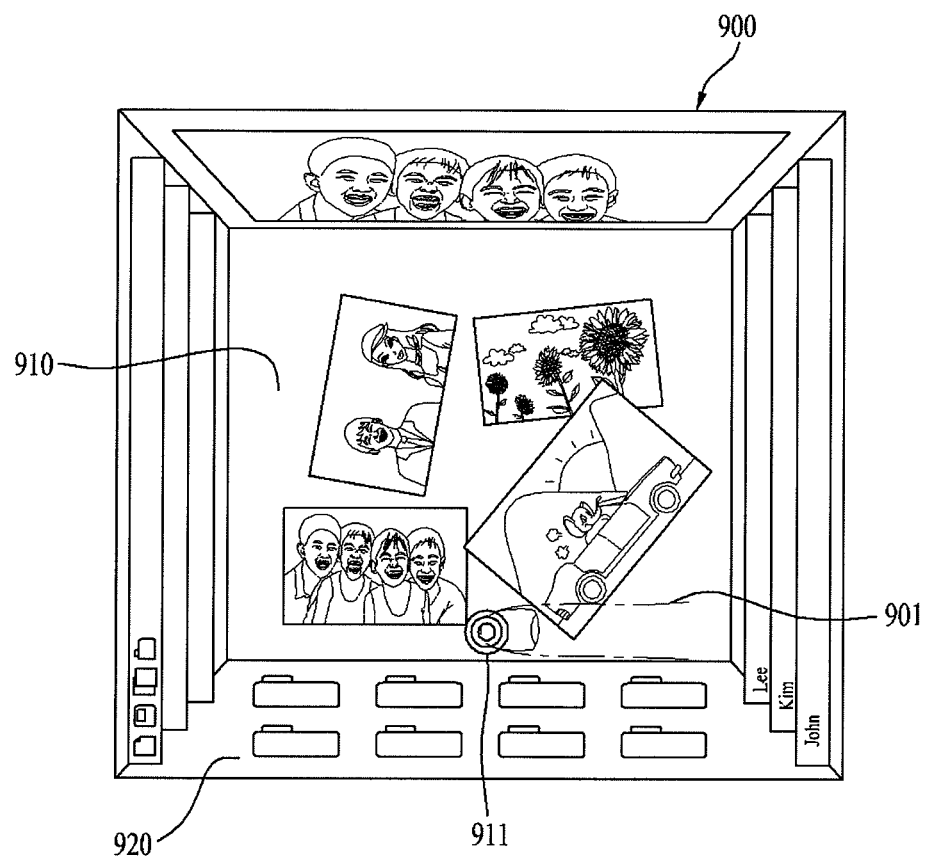
FIG. 9a to FIG. 9c respectively illustrate exemplary screens showing the process steps of the interface method shifting the main display layer to the sub-display layer according to the embodiment of the present invention.
Figure 9B:
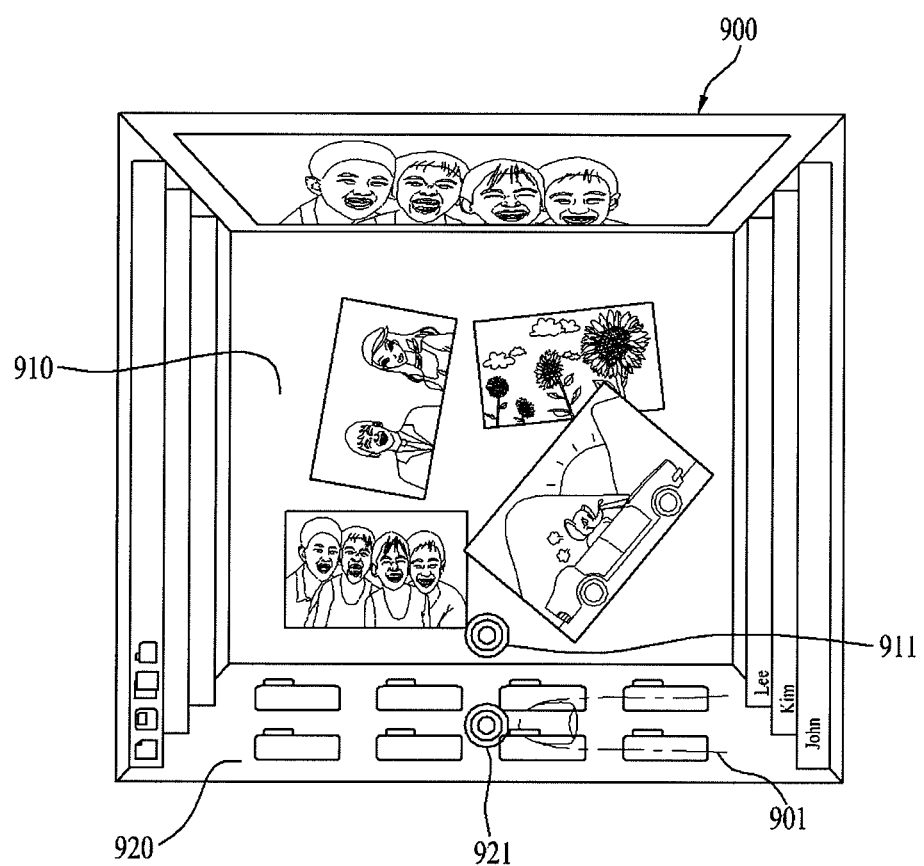
Figure 9C:
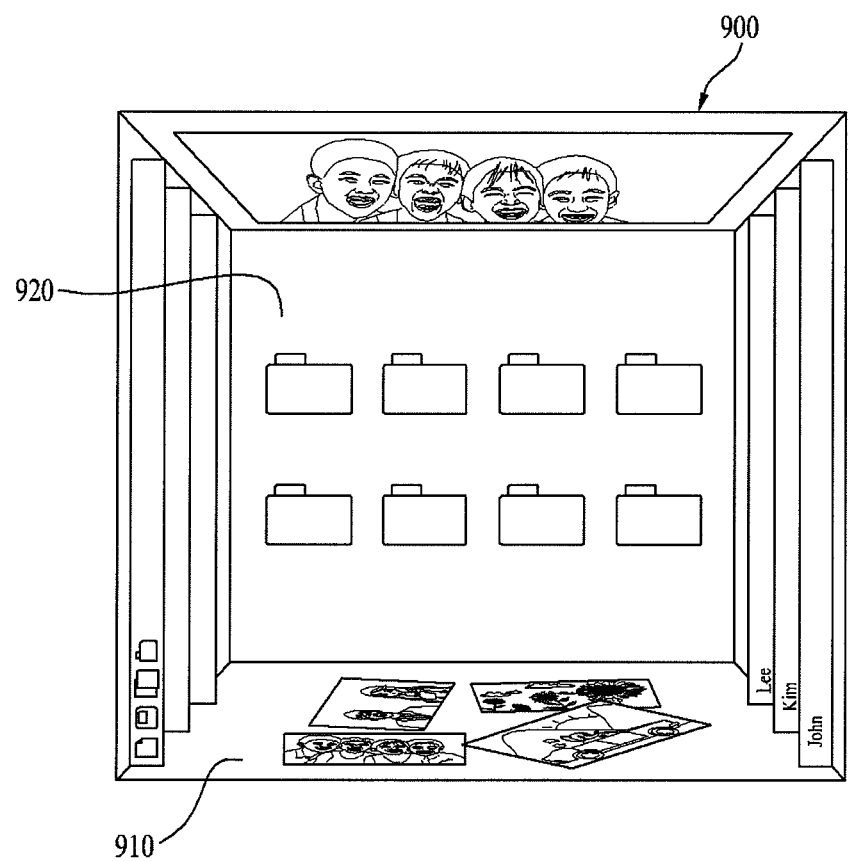

FIG. 9a to FIG. 9c respectively illustrate exemplary screens showing the process steps of the interface method shifting the main display layer to the sub-display layer according to the embodiment of the present invention.

Referring to FIG. 9a to FIG. 9c, the controller 190 detects an object-down event at a first position 911 within the main display layer 910. Then, the object 901 moves from the first position 911 to a second position 921. At this point, the object 901 may move while being in contact with the touch screen display 900, and the object 901 may move while the parameter between the object and the touch screen display exceeds a predetermined threshold value. Thereafter, the controller 190 detects an object-up event at the second position 921 within the sub display layer 920.

When the object-up event is detected, the controller 190 calculates a difference value between the time of occurrence of the object-down event at the first position 911 and the time of occurrence of the object-up event at the second position 921. Thereafter, when the calculated difference value is smaller than or equal to a time value predetermined in advance, the controller 190 changes the main display layer 910 and the sub display layer 920, as shown in FIG. 9c. Accordingly, the sub display layer 920 becomes the main display layer.

Figure 10:
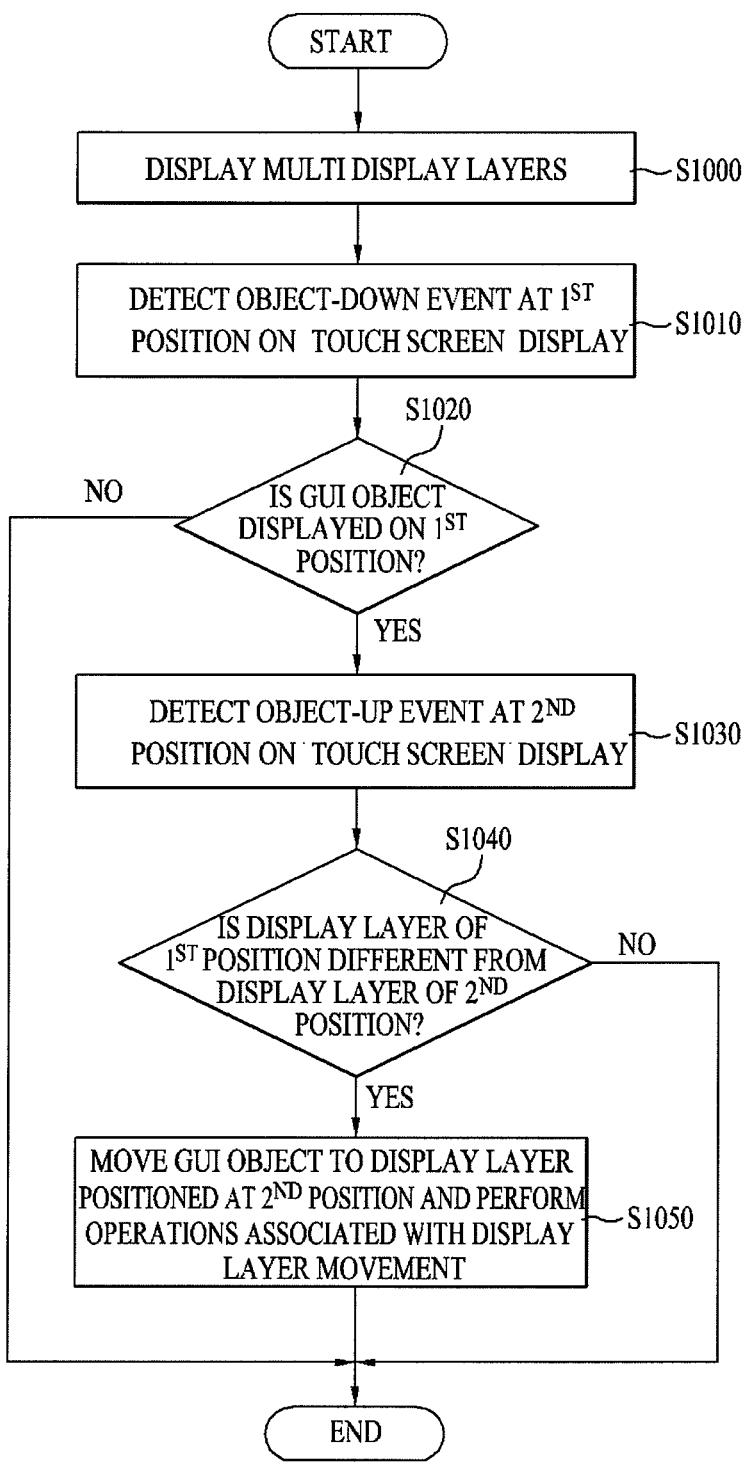
FIG. 10 illustrates process steps of an interface method moving (or re-positioning) a graphic user interface (GUI) object between display layers according to an embodiment of the present invention.

FIG. 10 illustrates process steps of an interface method moving (or re-positioning) a graphic user interface (GUI) object between display layers according to an embodiment of the present invention.

Referring to FIG. 10, the display 150 displays multi display layers (S1000). Herein, the multi display layers may be displayed in an alignment of a main display layer and a plurality of sub display layers, as shown in FIG. 2a to FIG. 3c.

The controller 190 detects an object-down event at a first position on the touch screen display (S1010).

Then, the controller 190 verifies whether or not a GUI object is displayed on the first position (S1020).

when the GUI object is displayed, the controller 190 detects an object-up event at a second position on the touch screen display (S1030).

The controller 190 determines whether or not the display layer of the first position and the display layer of the second position are different from one another (S1040).

When the display layer of the first position and the display layer of the second position are different from one another, the controller 190 moves the GUI object to a display layer located in the second position and performs operations associated with the movement of the display layer (S1050). When the moved GUI object is associated with a specific content (or file), the specific content may be displayed on the display layer that has been moved. And, the corresponding content may be copied to a folder corresponding to the moved position. Furthermore, the specific content may be transmitted to a device or a device having an address corresponding to the moved position.

Figure 11A:
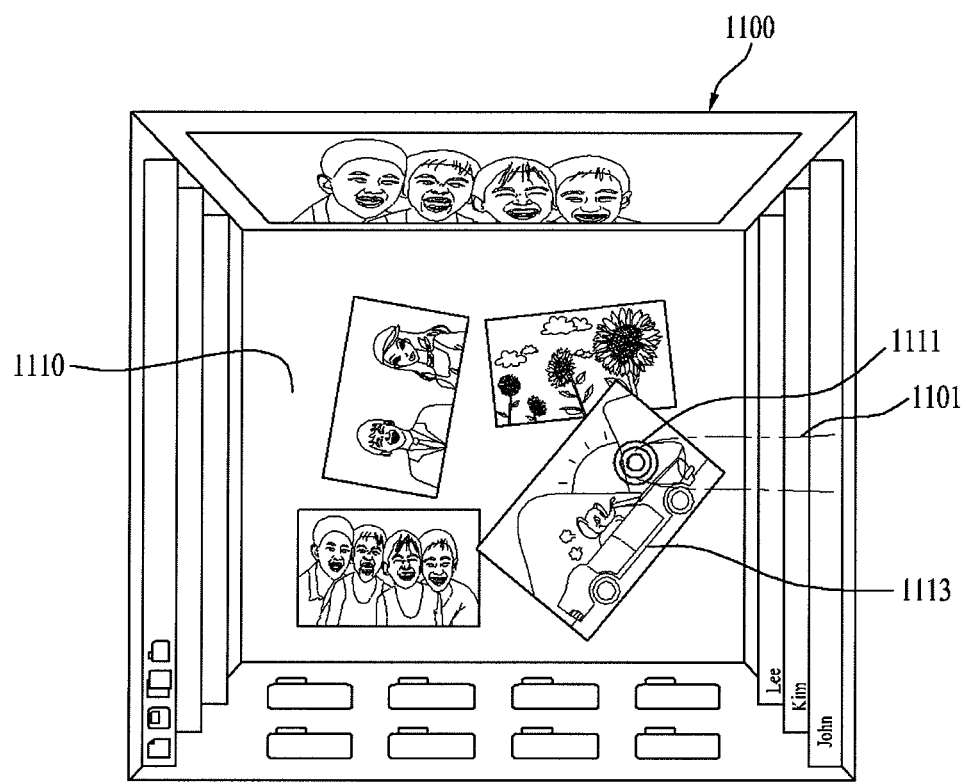
FIG. 11a to FIG. 11c respectively illustrate exemplary screens showing the process steps of the interface method moving (or re-positioning) a graphic user interface (GUI) object between display layers according to the embodiment of the present invention.
Figure 11B:
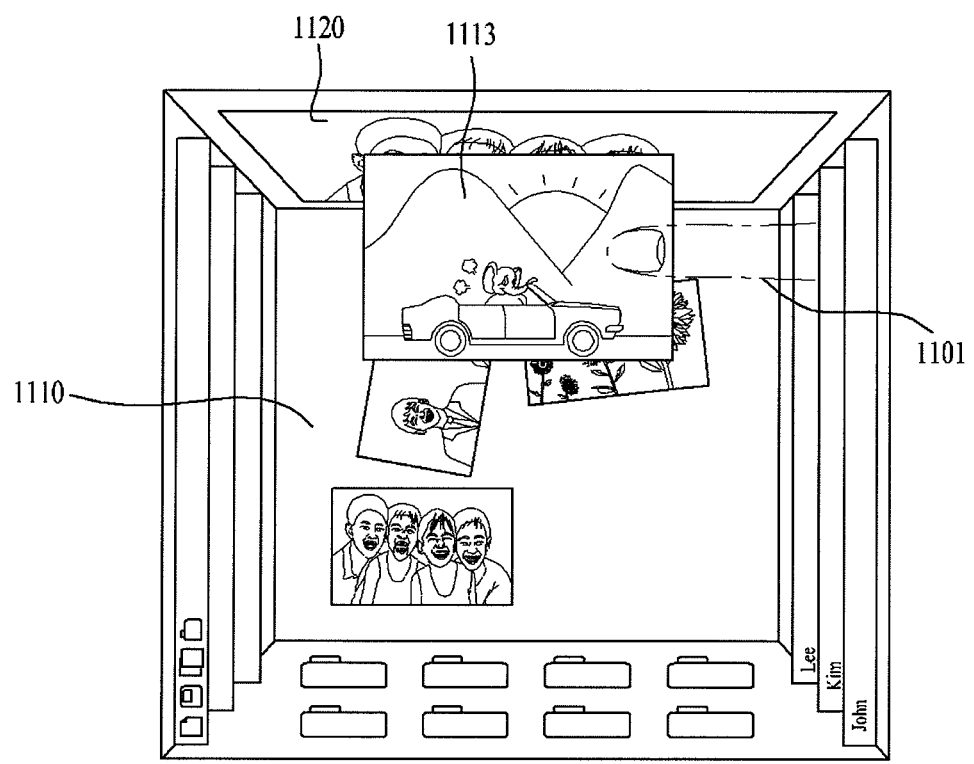
Figure 11C:
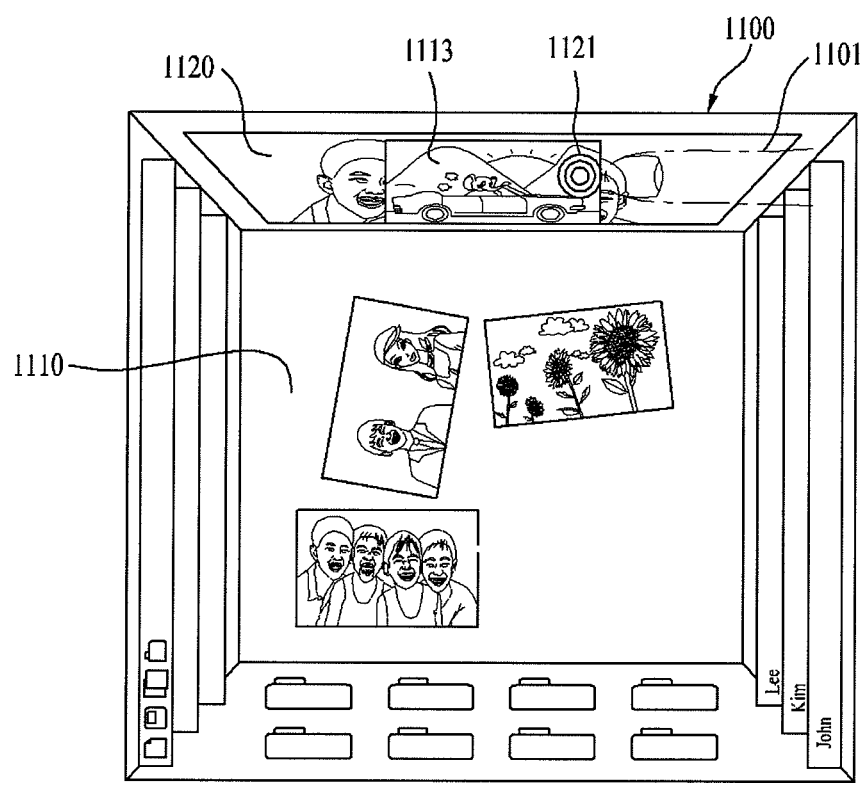

FIG. 11a to FIG. 11c respectively illustrate exemplary screens showing the process steps of the interface method moving (or re-positioning) a graphic user interface (GUI) object between display layers according to the embodiment of the present invention.

Referring to FIG. 11a to FIG. 11c, the controller 190 detects an object-down event at the first position 1111 within the main display layer 1110. The controller 190 verifies whether or not a display object is positioned at the first position 1111. The presence of the display object 1113 may be verified from the screen shown in FIG. 11a. Herein, the display object may correspond to a GUI object, a file object, a folder object, a picture, a channel image thumbnail screen, and so on.

In accordance with the movement of the object 1101, the display object 1110 is dragged, as shown in FIG. 11b. Herein, the controller 190 detects the object-dragging event in accordance with the movement of the object 1101.

The controller 190 detects the object-up event at the second position 1121 within the sub display layer 1120.

When the object-up event is detected, the controller 190 positions the moved object 1113 to the second position 1121 within the sub display layer 1120 and stops the movement.

As described above, the electronic device including a touch screen display, the interface method using the same, and the computer-readable storage medium storing the same according to the present invention have been described in detail. The present invention may be implemented as a code in the computer-readable storage medium, wherein the code can be read by the computer. The computer-readable storage medium includes all types of recording devices that are configured to store data that can be read by a computer device. Examples of the computer-readable storage media may include a ROM, a RAM, a CD-ROM, an electro-magnetic tape, a floppy disk, an optical data storage device, and so on. Furthermore, the computer-readable storage medium may also include storage media that car realized in the form of carrier waves (e.g., transmission via the Internet). Finally, the computer-readable storage medium may be dispersed to multiple computer device interconnected via network, thereby being capable of storing and executing computer-readable codes by using a dispersion method.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An interface method for controlling a display comprising a plurality of display areas in a device, the interface method comprising:

displaying, on a touch screen display of the device, a main display area and at least one sub display area, wherein the main display area is positioned at a center area of the touch screen display, and wherein each of the at least one sub display area is positioned at a side of the main display area;

detecting an object-down event at a first position within the main display area;

detecting an object-dragging event at a second position within the main display area; and moving the main display area along a movement direction from the first position to the second position, wherein a sub display area of the at least one sub display area is displayed to be pulled to the movement direction in accordance with the movement of the main display area.

2. The interface method of claim 1, wherein the pulled sub display area corresponds to a sub display area positioned in a direction opposite to the movement direction of the main display area.

3. The interface method of claim 1, further comprising:

detecting an object-up event at a third position within the main display area; and terminating the movement of the main display area in response to detecting the object-up event.

4. The interface method of claim 1, wherein the at least one sub display area is displayed so that the main display area appears to be positioned at a deeper end of the touch screen display.

5. The interface method of claim 1, wherein the at least one sub display area is displayed so that a width of the at least one sub display area is decreased along a direction facing into the main display area.

6. The interface method of claim 1, wherein the at least one sub display area includes a plurality of display areas respectively positioned at an upper-side, a lower-side, a left-side, and a right-side of the main display area.

7. The interface method of claim 1, wherein one of the at least one sub display area displays a broadcast image of at least one channel.

8. The interface method of claim 1, wherein one of the at least one sub display area displays information associated with contents being displayed on the main display area.

9. The interface method of claim 1, wherein one of the at least one sub display area displays a chat window.

10. An interface method for controlling a display comprising a plurality of display areas in a device, the interface method comprising:

displaying, on a touch screen display of the device, the plurality of display areas including a main display area and at least one sub display area, wherein the main display area is positioned at a center area of the touch screen display, and wherein each of the at least one sub display area is positioned at a side of the main display area;

detecting an object-down event at a first position of the touch screen display within a first area of the plurality of display areas;

detecting an object-up event at a second position of the touch screen display within a second area of the plurality of display areas; and changing a display state depending on locations of the first and second positions, wherein the first area is different from the second area.

11. The interface method of claim 10, wherein the changing of the display state includes:

determining whether the object-down event at the first location is on an object of the first area; and moving the object of the first area to the second position of the second area.

12. The interface method of claim 10, wherein the first area is the main display area and the second area is the at least one sub display area, the method further comprising:
   changing a position of the sub display area with a position of the main display area.

13. The interface method of claim 10, wherein the first area is the at least one sub display area and the second area is the main display area, the method further comprising:
   changing a position of the sub display area with a position of the main display area.

14. An electronic device, comprising:
   a touch screen display configured to display a main display area and at least one sub display area, wherein the main display area is positioned at a center area of the touch screen display, and each of the at least one sub display area is positioned at a side of the main display area; and
   a controller configured to:
   detect an object-down event at a first position within the main display area,
   detect an object-dragging event at a second position within the main display area, and
   move the main display area along a movement direction from the first position to the second position,
   wherein a sub display area of the at least one sub display area is displayed to be pulled towards the movement direction in accordance with the movement of the main display area.

15. The electronic device of claim 14, wherein the at least one sub display area is displayed so that the main displayer area appears to be positioned at a deeper end of the touch screen display.

16. The electronic device of claim 14, wherein the at least one sub display area is displayed so that a width of the at least one sub display area is decreased along a direction facing into the main display area.

17. The electronic device of claim 14, wherein the at least one sub display area includes a plurality of sub display areas respectively positioned at an upper-side, a lower-side, a left-side, and a right-side of the main display area.

18. The electronic device of claim 14, wherein one of the at least one sub display area displays a broadcast image of at least one channel.

19. The electronic device of claim 14, wherein one of the at least one sub display area displays information associated with contents being displayed on the main display area.

20. The electronic device of claim 14, wherein one of the at least one sub display area displays a chat window.

21. The electronic device of claim 14, wherein the pulled sub display area corresponds to a sub display area positioned in a direction opposite to the movement direction of the main display area.

22. The electronic device of claim 14, wherein the controller detects an object-up event at a third position within the main display area and terminates the movement of the main display area in response to detecting the object-up event.

\* \* \* \* \*